(12) United States Patent
Forgang et al.

(10) Patent No.: US 8,237,446 B2
(45) Date of Patent: Aug. 7, 2012

(54) HIGH RESOLUTION RESISTIVITY EARTH IMAGER

(75) Inventors: Stanislav W. Forgang, Houston, TX (US); Randy Gold, Houston, TX (US); Peter J. Nolan, Houston, TX (US); Carlos A. Yanzig, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 753 days.

(21) Appl. No.: 12/199,278

(22) Filed: Aug. 27, 2008

(65) Prior Publication Data

US 2010/0052687 A1    Mar. 4, 2010

(51) Int. Cl.
*G01R 3/00* (2006.01)
(52) U.S. Cl. .......... 324/367; 324/374; 324/355
(58) Field of Classification Search .......... None
See application file for complete search history.

(56) References Cited

U.S. PATENT DOCUMENTS

| 4,468,623 | A | * | 8/1984 | Gianzero et al. ............ 324/367 |
| 5,008,625 | A | * | 4/1991 | Chen ............................ 324/351 |
| 5,242,020 | A | * | 9/1993 | Cobern ...................... 166/254.2 |
| 5,502,686 | A | * | 3/1996 | Dory et al. ...................... 367/34 |
| 6,191,588 | B1 | | 2/2001 | Chen |
| 6,919,724 | B2 | | 7/2005 | Cheung et al. |
| 7,062,072 | B2 | | 6/2006 | Anxionnaz et al. |
| 7,066,282 | B2 | | 6/2006 | Chen et al. |
| 7,098,664 | B2 | | 8/2006 | Bittar et al. |
| 2002/0166699 | A1 | | 11/2002 | Evans |
| 2005/0133262 | A1 | | 6/2005 | Chen et al. |

OTHER PUBLICATIONS

P. Cheung et al.; "A Clear Picture in Oil-Base Muds", Oilfield Review, Winter 2001/2002, pp. 2-27.

* cited by examiner

*Primary Examiner* — Paresh Patel
(74) *Attorney, Agent, or Firm* — Mossman, Kumar & Tyler, PC

(57) ABSTRACT

An imaging tool made includes a pad whose curvature is chosen based on the expected range of borehole radius and the pad size so as to maintain the maximum standoff below a desired value. The curvature may be adjusted using fasteners.

13 Claims, 5 Drawing Sheets

HIGH RESOLUTION RESISTIVITY EARTH IMAGER

BACKGROUND OF THE DISCLOSURE

1. Field of the Disclosure

This disclosure generally relates to exploration for hydrocarbons involving electrical investigations of a borehole penetrating an earth formation. More specifically, this disclosure relates to a method and apparatus having the flexibility to provide an image of a borehole wall for a wide range of borehole sizes.

2. Background of the Art

Electrical borehole logging is often used to provide images of an electrical property of boreholes. There are two categories of devices typically used as electrical logging devices for imaging boreholes. In the first category (galvanic devices), a measure electrode (current source or sink) is used in conjunction with a return electrode (such as the tool body). A current flows from a current source in the tool to a measure electrode through the earth formation. The current returns to the source via another electrode. The second category relates to inductive measuring tools in which an antenna within the electrical logging tool induces a current flow within the earth formation. The magnitude of the induced current is detected using either the same antenna or a separate antenna.

There are several modes of operation of a galvanic device. In one mode, the current at a current electrode is maintained constant and a voltage is measured between a pair of monitor electrodes. In another mode, the voltage of the measure electrode is fixed and the current flowing from the measure electrode is measured.

The galvanic devices are contact devices, in that the measure electrodes generally come in contact with the borehole wall during logging of the wellbore. Such devices are sensitive to the effects of borehole rugosity, borehole size, and the standoff of the pad carrying the measure electrodes. The present disclosure provides an improved electrical logging tool that reduces the effects of the pad offset.

SUMMARY OF THE DISCLOSURE

One embodiment of the disclosure provides a method of generating an image of a resistivity property of an earth formation. In one aspect, a method may include: determining a size of a borehole in which a resistivity imaging instrument is to be used; selecting a radius of curvature of a pad of the resistivity imaging instrument based on a pad size, the size of the borehole, and a selected value for a maximum standoff of the pad; conveying the resistivity imaging instrument into the borehole; using a plurality of sensors on the pad responsive to a formation resistivity to obtain measurements indicative of the resistivity property; and providing the image of the resistivity property of the earth formation using the measurements obtained by the plurality of sensors.

Another embodiment of the disclosure includes an apparatus for providing an image of a resistivity property of an earth formation. In one aspect, the apparatus may include a resistivity imaging instrument configured to be conveyed into a borehole, wherein the he resistivity imaging instrument includes a pad having a radius of curvature that is determined by using a pad size, a borehole size, and a selected value for a maximum standoff of the pad between the pad and inside of the borehole. The apparatus may further include at least one processor configured to: use an output of each of a plurality of sensors on the pad responsive to a resistivity property of the earth formation to provide an image of the resistivity property.

Another embodiment according the disclosure provides a computer-readable-medium for use with an apparatus for providing a resistivity image of an earth formation, wherein the apparatus comprises a resistivity imaging instrument configured to be conveyed into a borehole, the resistivity imaging instrument having a pad with a radius of curvature determined using a pad size, a borehole size, and a defined value for a maximum standoff of the pad; wherein the computer-readable-medium comprises instructions that enable at least one processor to: use an output of each of a plurality of sensors on the pad responsive to a resistivity property of the earth formation to provide an image of the resistivity property.

BRIEF DESCRIPTION OF THE FIGURES

The present disclosure is best understood with reference to the accompanying figures in which like numerals generally refer to like elements and in which.

DETAILED DESCRIPTION OF THE DISCLOSURE

Figure 1:
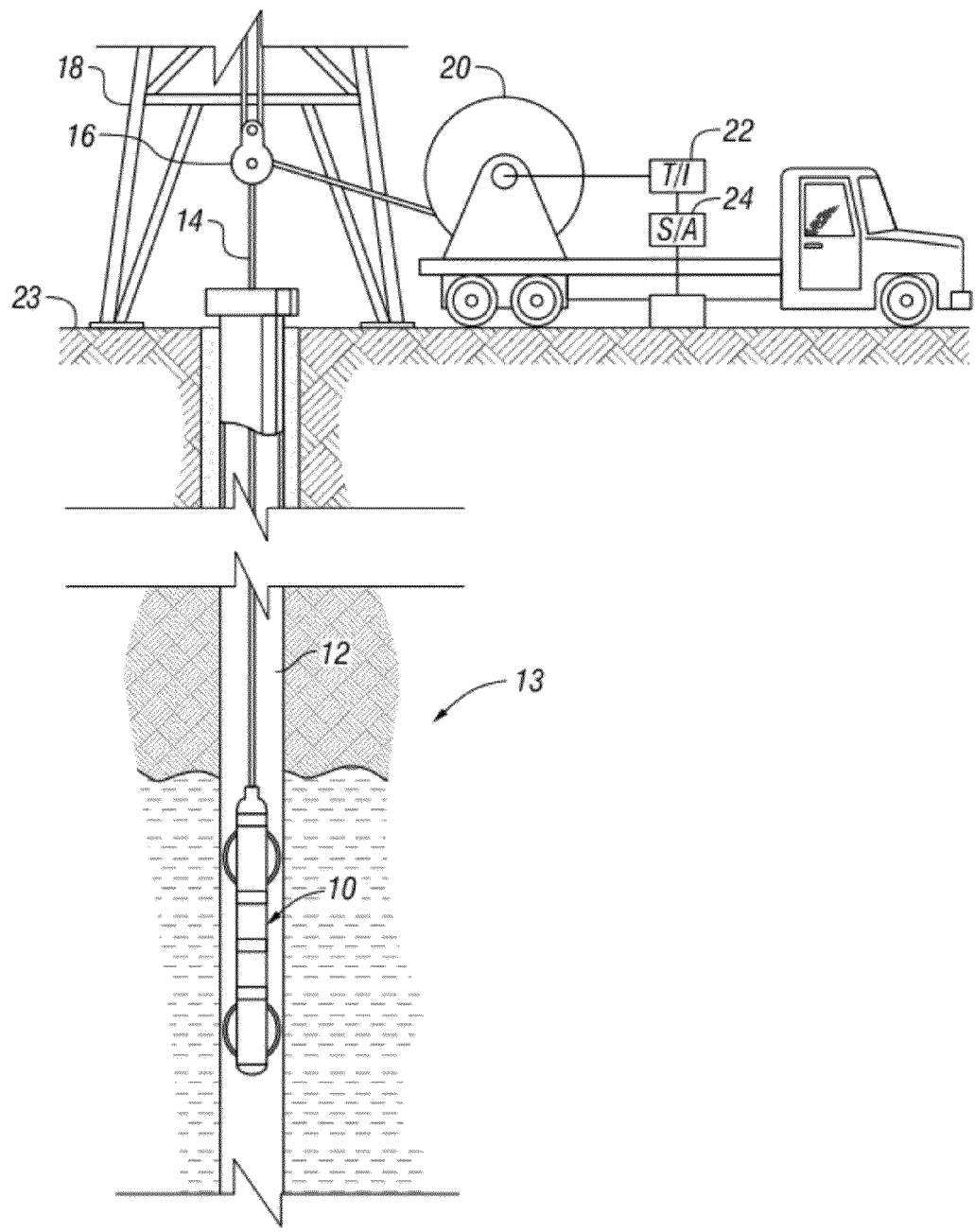
FIG. 1 shows an exemplary logging tool that includes an imaging tool made according to one embodiment of the disclosure in a borehole.

FIG. 1 shows an exemplary logging tool 10 suspended in a borehole 12 that penetrates an earth formations 13 from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. The tool 10 includes a novel pad that is discussed below.

Figures 2A, 2B:
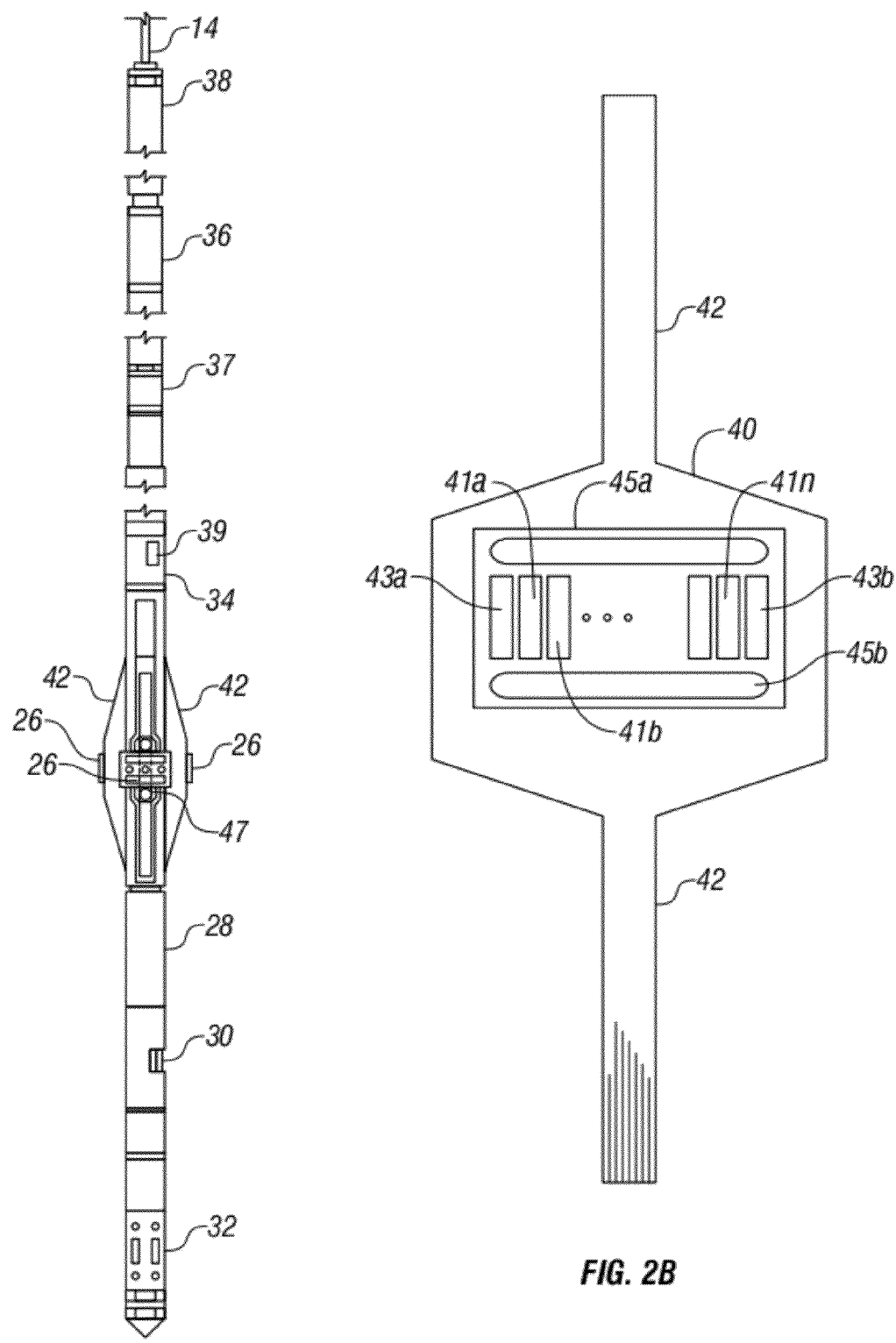
FIG. 2A is a schematic diagram of an exemplary imaging tool made according to one embodiment of the disclosure for use in a logging tool, such as the logging tool of FIG. 1.
FIG. 2B is a detailed view of a pad made according to one embodiment of the disclosure for use in an imaging tool, such as the imaging tool shown in FIG. 2A.

FIG. 2A is a schematic external view of a borehole imaging tool 10 made according to one embodiment of the disclosure. The tool 10 comprises resistivity arrays 26 and, optionally, a mud cell 30 and a circumferential acoustic televiewer 32.

Electronics modules 28 may be located at suitable locations in the system and not necessarily in the location indicated. The various components of the imaging tool may be mounted on a mandrel 34 in any suitable manner, including processor 39. An orientation module 36 including a magnetometer and an accelerometer or inertial guidance system may be mounted above the imaging assemblies 26 and 32. The upper portion of the tool 10 contains a telemetry module 38 for sampling, digitizing and transmission of the data samples from the various components of the tool 10 to the surface electronic module 22. The data from the various components is digitized before sending such data to the surface electronic module 22. In an alternative arrangement, the data may be transmitted in analog form and digitized by surface electronics 22.

Also shown in FIG. 2A are three resistivity arrays 26 (a fourth resistivity array is hidden in this view). Referring to FIGS. 2A and 2B, each pad 40 placed on a spring member 42. A pad 42 includes an array of measure electrodes 41*a*, 41*b*, . . . 41*n* for injecting electrical currents into the formation, focusing electrodes 43*a*, 43*b* for horizontal focusing of the electrical currents from the measure electrodes and focusing electrodes 45*a*, 45*b* for vertical focusing of the electrical currents from the measure electrodes. For the purpose of this disclosure the term, "vertical" refers to the direction along the axis of the borehole and "horizontal" refers to a plane perpendicular to the vertical.

Figure 3A:
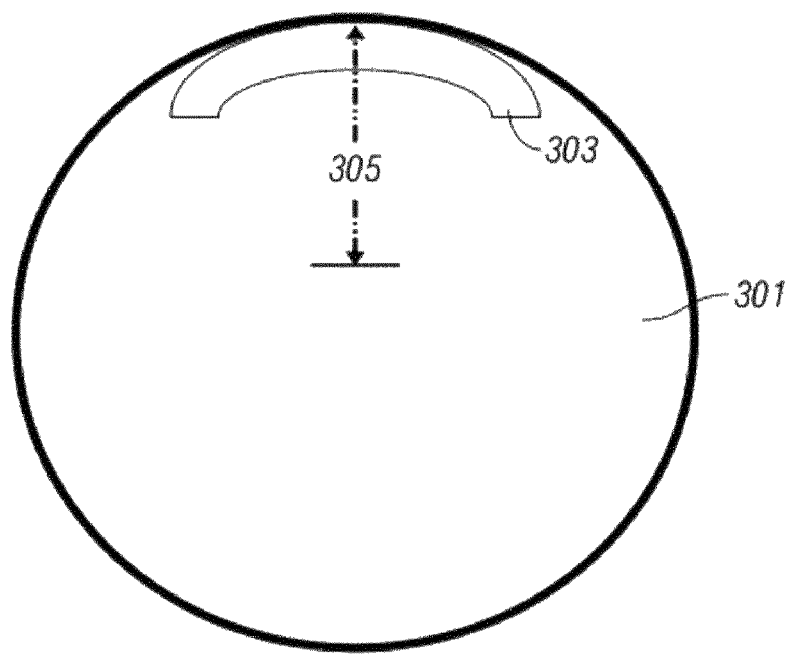
FIG. 3A illustrates a pad having a smaller radius of curvature than a borehole.

FIG. 3A shows an exemplary pad 303 having a radius of curvature 305 inside a borehole 301. In the pad shown, the radius of curvature of the pad 303 is less than the radius of the borehole, so that at the center of the pad the standoff is zero and it increases away from the center of the pad.

Figure 3B:
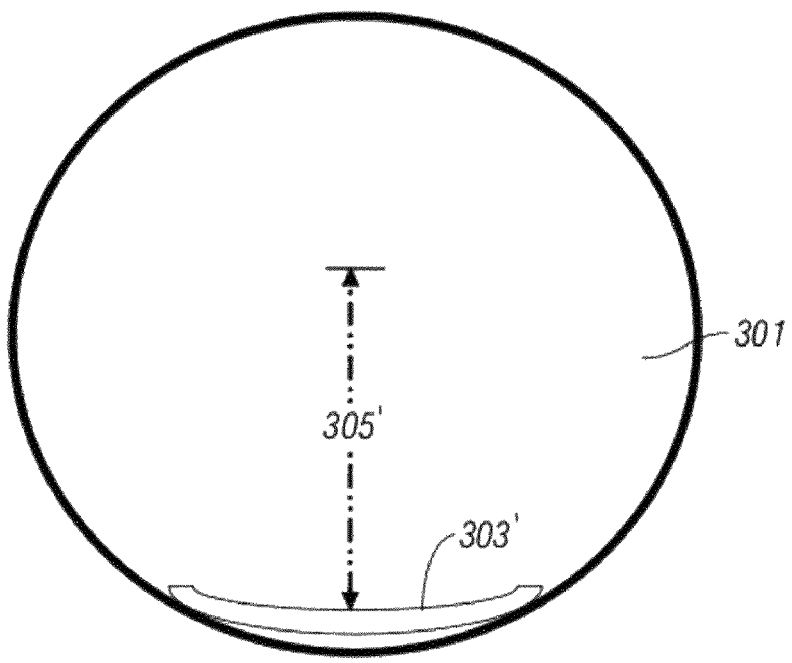
FIG. 3B illustrates a pad having a larger radius of curvature than a borehole.

In contrast, in FIG. 3B, the pad 303' has a larger radius of curvature 305' than the radius of the borehole 301, so that the center of the pad has a standoff from the borehole wall while the edges of the pad have a smaller or no standoff. The results of calculations showing the effects of pad radius and borehole radius are discussed reference to FIG. 4.

Figure 4:
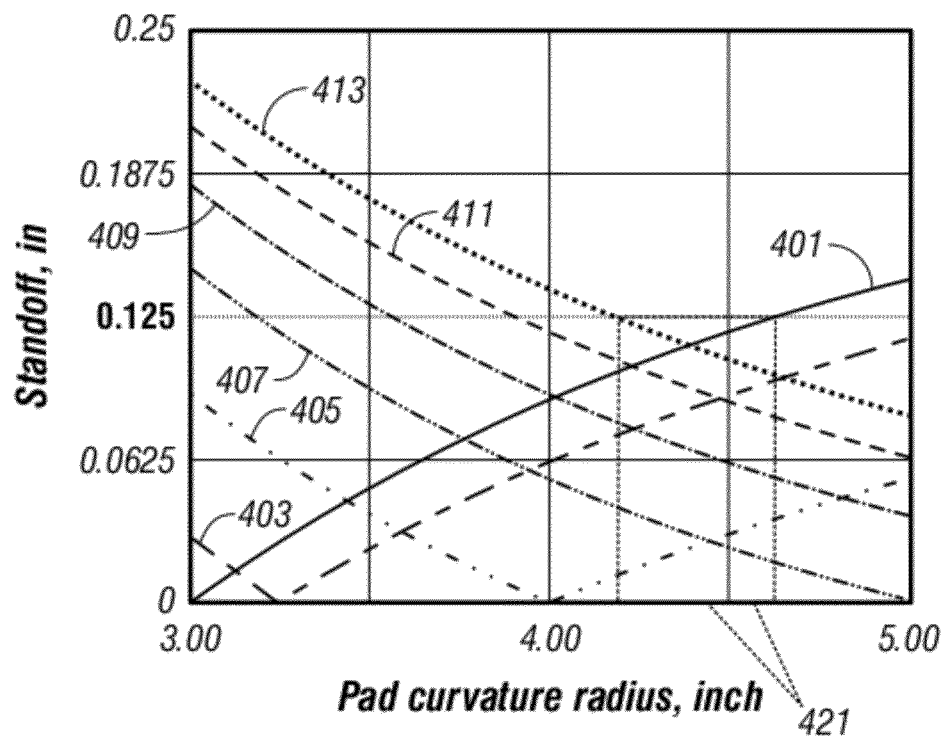
FIG. 4 shows a relation between pad radius, borehole radius and maximum standoff according to one aspect of the disclosure for use in an imaging tool, such as the imaging tool shown in FIG. 2.

Shown in FIG. 4 are plots of the pad radius of curvature (in inches) as the asbscissa and the standoff (ordinate) for borehole radius of 3.00" (7.62 cm) 401, 3.25" (8.255 cm) 403, 4" (10.16 cm) 405, 5" (12.7 cm) 407, 6" (15.48 cm) 409, 7" (17.78 cm) 411 and 8" (20.32 cm) 413. The plots correspond to the maximum standoff for the exemplary pad.

In FIG. 4, the curves with negative slope correspond to cases where the resistivity electrodes on the edge of the pad have the maximum standoff while the curves with positive slope correspond to the case where the measure electrodes at the center of the pad have the maximum standoff.

FIG. 4 is instructive in that for the exemplary tool a pad radius of curvature of between 4.2" (10.67 cm) and 4.6" (11.69 cm) defined by the region 421 has a maximum acceptable standoff of less than ¼" (6.35 mm) that has been found to be acceptable in simulations and in practice. This is acceptable for a large range of borehole sizes (from 6" diameter to 16" diameter. This leads to one embodiment of the disclosure, namely selecting a pad having a radius of curvature that has an acceptable standoff (less than a specified maximum) for the specified range of borehole sizes to be encountered in practice. The pad may be configured for any suitable standoff.

Figure 5:
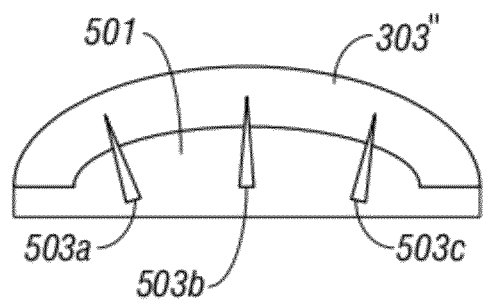
FIG. 5 shows a pad for which the radius of curvature may be adjusted.

The results of FIG. 4, as an example, also lead to a second embodiment of the disclosure, illustrated in FIG. 5. Shown in FIG. 5 is a pad 303". That includes a backing material 501 and a set of adjustable fasteners 503*a*, 503*b*, 503*c*, which can be adjusted to change the radius of curvature of the pad face. In this example, three fasteners are shown, but this is not to be construed as a limitation to the disclosure. Those versed in the art would recognize that a minimum of a single fastener in the center is sufficient to alter the curvature of the pad 303, while a plurality of fasteners will typically provide a better match of the pad face to the borehole wall.

The electronics associated with each pad may be the same as in prior art. Any suitable coupling arrangement including but not limited to those that can withstand the pressure and fluids downhole may be used. The present disclosure does envisage the possibility of using fewer than the full complement of electrodes on the pad. In such cases, the same azimuthal electrode spacing may correspond to a smaller azimuthal separation for a borehole of large radius than for a borehole of a smaller radius. Using a subset of the azimuthal electrodes provides flexibility in the azimuthal resolution of the produced image. Using a subset of the electrodes may also be used to reduce the effective azimuthal pad size when the standoff on the edges of the pad is excessive.

For a borehole of larger radius, there may be gaps in the full 360° image since each pad would provide a smaller azimuthal coverage. Any suitable interpolation technique may be used to fill in the gaps in the image.

Figure 6:
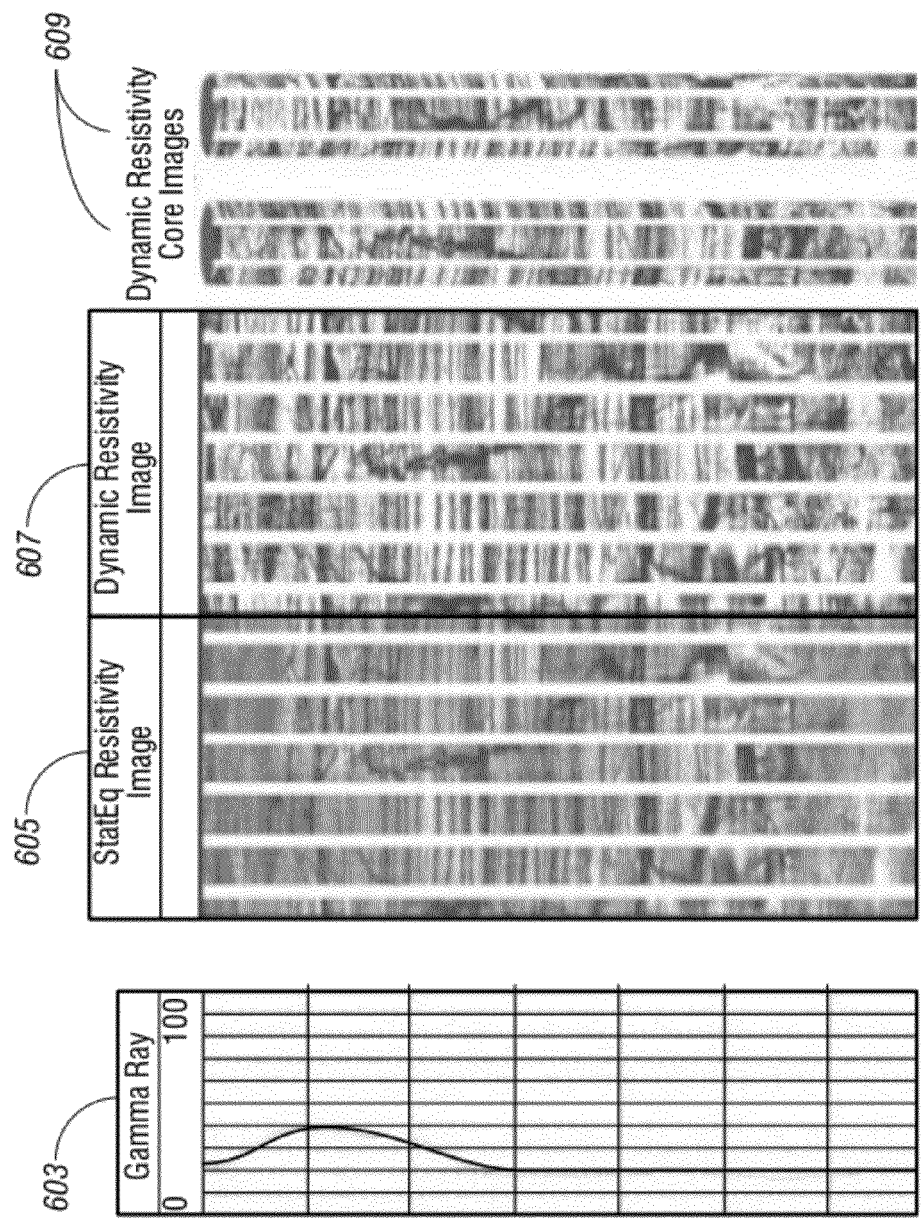
FIG. 6 shows an exemplary image obtained with a resistivity imaging tool.

Referring now to FIG. 6, an exemplary image is shown. A caliper log is shown by 601, a gamma ray log by 603, a two dimensional (2-D) image of the borehole wall with a fixed gain display by 605 and a 2-D image of the borehole wall with a dynamic gain applied to the display by 607. Two isometric views of the borehole wall in cylindrical geometry are shown in 609. The determined image may then be recorded on a suitable medium such as a memory device.

The embodiments presented herein relate to galvanic devices in which the current in current electrodes is used for resistivity imaging. The principles and methods described above may also be used for galvanic devices in which voltages across pairs of electrodes are used. The principles and method described above are equally applicable to induction devices in which small antenna loops 47 are used to measure the magnetic field produced by induced currents flowing in the formation. For this reason, the term sensor is intended to include both electrodes and sensing antennas.

The description above has been in the context of a wireline conveyed imaging pad. An implementation for a measurement-while-drilling is also possible. Drilling is carried out by a drillbit on a bottomhole assembly (BHA) conveyed on a drilling tubular. In particular, there are at least two situations in which the pad curvature may need to be adjusted to match the curvature of the borehole. The first situation where a pad mounted imaging device may be used is when drilling is done using an oversized drillbit. The use of an extendable pad has been discussed, for example, in U.S. Pat. No. 5,242,020 to Cobern, having the same assignee as the present disclosure and the contents of which are incorporated herein by reference. The second situation is when there is an axial separation between the drillbit and the imaging pad and the borehole has caved in or been washed out.

Implicit in the processing of the data is the use of a computer program implemented on a suitable machine readable medium that enables one or more processors to perform the acquisition and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface.

While the foregoing disclosure is directed to certain embodiments of the disclosure, various modifications will be apparent to those skilled in the art. It is intended that all such variations within the scope and spirit of the appended claims be embraced by the foregoing disclosure.

What is claimed is:

1. A method of providing an image of a resistivity property of an earth formation, the method comprising:
   determining a size of a borehole in which a resistivity imaging instrument is to be used;
   selecting a radius of curvature of a pad of the resistivity imaging instrument based on a pad size, the size of the borehole, and a selected value for a maximum standoff of the pad;
   using at least one fastening device to adjust the radius of curvature of the pad to be substantially equal to the selected radius of curvature;
   conveying the resistivity imaging instrument into the borehole;
   using a plurality of sensors on the pad responsive to a formation resistivity to obtain measurements indicative of the resistivity property; and
   providing the image of the resistivity property using the measurements obtained by the plurality of sensors.

2. The method of claim 1 further comprising specifying the value of maximum standoff based on a simulation result.

3. The method of claim 1 wherein the plurality sensors comprise electrodes and the measurements comprise currents.

4. The method of claim 1 wherein the plurality of sensors comprise antennas responsive to a magnetic field produced by a current in the formation.

5. The method of claim 1 further comprising conveying the resistivity imaging instrument into the borehole as part of a string of logging instruments on a wireline.

6. The method of claim 1 further comprising producing the resistivity image using an output of a subset of the plurality of sensors.

7. An apparatus for providing an image of a resistivity property of an earth formation, the apparatus comprising:
   a resistivity imaging instrument including:
      a pad having a radius of curvature, and
      at least one fastener configured to adjust the radius of curvature of the pad to a selected radius of curvature, the selected radius of curvature being determined by using a pad size, a borehole size, and a defined value for a maximum standoff of the pad; and
   at least one processor configured to use an output of each of plurality of sensors on the pad responsive to a resistivity property of the earth formation to provide an image of the resistivity property.

8. The apparatus of claim 7 wherein the plurality of sensors comprise electrodes and the output of the sensors comprise currents.

9. The apparatus of claim 7 wherein the plurality of sensors comprise antennas responsive to a magnetic field produced by a current in the formation.

10. The apparatus of claim 7 further comprising a wireline configured to convey the resistivity imaging instrument into the borehole.

11. The apparatus of claim 7 further wherein the pad is extendable from a bottomhole assembly conveyed on a drilling tubular.

12. A non-transitory computer-readable medium product accessible to a processor, the computer-readable medium including instructions which enable the processor to use measurements made by a resistivity imaging instrument having a pad whose radius of curvature is determined using a pad size, a borehole size, and a defined value for a maximum standoff of the pad, to provide an image of the resistivity property, wherein at least one fastener is configured to modify the radius of curvature of the pad to be substantially equal to the determined radius of curvature.

13. The non-transitory computer-readable medium product of claim 12 further comprising at least one of: (i) a ROM, (ii) an EPROM, (iii) an EAROM, (iv) a flash memory, and (v) an optical disk.

* * * * *